United States Patent

Numa et al.

[11] Patent Number: 5,886,082
[45] Date of Patent: Mar. 23, 1999

[54] AQUEOUS COATING COMPOSITION

[75] Inventors: Nobushige Numa, Ebina; Yoshihiro Okamoto, Hiratsuka, both of Japan

[73] Assignee: Kansai Paint Co., Ltd., Hyogo-ken, Japan

[21] Appl. No.: 627,100

[22] Filed: Apr. 3, 1996

[30] Foreign Application Priority Data

Apr. 5, 1995 [JP] Japan .................................. 7-106907
Apr. 5, 1995 [JP] Japan .................................. 7-106911

[51] Int. Cl.$^6$ ........................................ C08J 3/02
[52] U.S. Cl. .................. 524/501; 428/423.1; 428/424.2; 428/424.4; 428/425.5; 524/507
[58] Field of Search .................. 524/501, 507; 428/423.1, 424.2, 424.4, 425.5

[56] References Cited

U.S. PATENT DOCUMENTS

| | | | |
|---|---|---|---|
| 3,567,499 | 3/1971 | Klebert et al. | 524/501 X |
| 4,624,973 | 11/1986 | Kuwajima et al. | 524/501 X |
| 5,157,069 | 10/1992 | Campbell | 524/507 X |
| 5,204,404 | 4/1993 | Werner, Jr. et al. | 524/501 |
| 5,227,422 | 7/1993 | Mitsuji et al. | 524/507 X |
| 5,230,962 | 7/1993 | Stephenson | 428/423.1 |
| 5,236,982 | 8/1993 | Cossement et al. | 524/507 X |
| 5,250,605 | 10/1993 | Hazan et al. | 524/504 |
| 5,258,443 | 11/1993 | Nield et al. | 524/501 |
| 5,281,655 | 1/1994 | Mitsuji et al. | 524/507 |
| 5,331,050 | 7/1994 | Harper | 524/507 X |
| 5,332,766 | 7/1994 | Takaya et al. | 524/510 X |
| 5,393,823 | 2/1995 | Konno et al. | 524/507 |
| 5,428,088 | 6/1995 | Yamamoto et al. | 524/507 X |

*Primary Examiner*—Judy M. Reddick
*Attorney, Agent, or Firm*—Wenderoth, Lind & Ponack, L.L.P.

[57] ABSTRACT

An aqueous coating composition comprising, as main components, (A) an aqueous dispersion of a water-dispersible acrylic copolymer of acid value 20–150 optionally having hydroxyl group, which copolymer is obtained by copolymerizing an alkoxysilane group-containing vinyl monomer with a carboxyl group-containing unsaturated monomer and, as necessary, other polymerizable monomer copolymerizable with said monomers, (B) an aqueous polyurethane resin, and optionally (C) a polyisocyanate compound.

With this composition, there can be formed, on a substrate, a coating film which is excellent in water resistance and solvent resistance and which is good in adhesivity, finish of film, etc.

28 Claims, No Drawings

AQUEOUS COATING COMPOSITION

The present invention relates to an aqueous coating composition comprising, as base components, a mixture of an aqueous dispersion of an alkoxysilane group-containing water-dispersible acrylic resin and an aqueous polyurethane resin.

In recent years, restriction on release of organic solvents into the atmosphere has been intensified owing to the increasing interest on environmental problems. This is no exception in the coating field. Since organic solvent type coatings release large amounts of organic solvents into air, it has been studied to reduce the amount of organic solvent used in organic solvent type coating. As one approach to drastic reduction of organic solvent, there has been made many researches for conversion of organic solvent type coating into aqueous coating containing substantially no organic solvent.

As an example, it has been studied to use an aqueous coating as a base coating for automobiles or automobile repair (organic solvent type coatings have generally been used as the base coating), and particularly an aqueous polyurethane resin is widely used in the aqueous coating, owing to its excellent flexibility.

The aqueous base coating containing an aqueous polyurethane resin as a base component is used generally in the form of a non-crosslinking aqueous dispersion or emulsion. However, the coating film formed therewith is insufficient in water resistance, adhesivity to adjacent films (lower and/or upper film), surface appearance of film after application of top coating, particularly solvent type top coating, etc.; and has problems in practical application.

Also, as an aqueous coating capable of forming a film having excellent properties (weatherability, solvent resistance and other properties) similar to those of the films of organic solvent type crosslinking coatings, there were proposed, for example, two-pack type polyurethane aqueous coating compositions [see Japanese Patent Application Kokai (Laid-Open) No. 105879/1990 (=U.S. Pat. No. 5,075,370), Japanese Patent Application Kokai (Laid-Open) No. 41270/1985 (=U.S. Pat. No. 4,711,918)].

The above two-pack type polyurethane aqueous coating compositions each use a polymer produced using, as a polyol component, a hydroxyl group-containing olefinic unsaturated compound, and have a problem of being slow in initial cure in 1–3 days from application when drying is made at 40° C. or lower, particularly at ordinary temperature. Further, it is difficult to allow the films formed therewith to have excellent tensile strength and elongation. Furthermore, when an emulsifier is used in preparation of the above coating compositions, the emulsifier remains in the films formed with the coating compositions, inviting low water resistance of film.

The present inventors made a study with an object of eliminating the above-mentioned problems of coating compositions using an aqueous polyurethane resin as a base component. As a result, the present inventors found out that the above object can be achieved by using an aqueous polyurethane resin in combination with an aqueous dispersion of a particular alkoxysilane group-containing water-dispersible acrylic copolymer. The finding has led to the completion of the present invention.

According to the present invention, there is provided an aqueous coating composition comprising, as main components, (A) an aqueous dispersion of a water-dispersible acrylic copolymer having an acid value of 20–150, which copolymer is obtained by copolymerizing an alkoxysilane group-containing vinyl monomer represented by the following general formula (I):

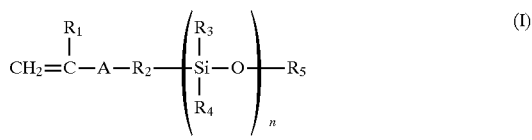

(wherein A is

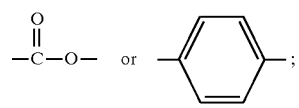

R$_1$ is a hydrogen atom or a methyl group; R$_2$ is a bivalent aliphatic saturated hydrocarbon group of 1–15 carbon atoms; R$_3$ and R$_4$ are each a phenyl group, an alkyl group of 1–6 carbon atoms or an alkoxy group of 1–10 carbon atoms; R$_5$ is an alkyl group of 1–10 carbon atoms; and n is an integer of 1–100)

with a carboxyl group-containing unsaturated monomer and, as necessary, other polymerizable monomer copolymerizable with said two monomers, with the monomer of formula (I) used in an amount of 1–90% by weight based on the total amount of all the monomers, and (B) an aqueous polyurethane resin.

The above aqueous coating composition provided by the present invention is a self-crosslinking coating composition which is cured by a crosslinking reaction between silanol groups formed by the hydrolysis of the alkoxysilane group of the water-dispersible acrylic copolymer component present in the coating composition. When in the above coating composition, (1) the water-dispersible acrylic copolymer is allowed to contain, as an essential monomer, a hydroxyl group-containing unsaturated monomer as the other polymerizable monomer or as part of the other polymerizable monomer and further (2) a polyisocyanate compound having at least two isocyanate groups in the molecule is used as an external cross-linking agent, there can be provided a coating composition which is cured by two reactions of siloxane cross-linking and urethane crosslinking and which can form a coating film significantly improved in film properties.

According to one particular aspect of the present invention, there is provided an aqueous coating composition comprising, as main components, (A) an aqueous dispersion of a water-dispersible acrylic copolymer having an acid value of 20–150 and a hydroxyl value of 10–250, which copolymer is obtained by copolymerizing an alkoxysilane group-containing vinyl monomer represented by the following general formula (I):

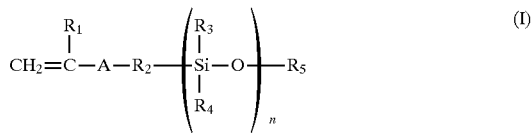

(wherein A is

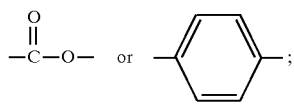

R₁ is a hydrogen atom or a methyl group; R₂ is a bivalent aliphatic saturated hydrocarbon group of 1–15 carbon atoms; R₃ and R₄ are each a phenyl group, an alkyl group of 1–6 carbon atoms or an alkoxy group of 1–10 carbon atoms; R₅ is an alkyl group of 1–10 carbon atoms; and n is an integer of 1–100)

with a carboxyl group-containing unsaturated monomer, a hydroxyl group-containing unsaturated monomer and, as necessary, other polymerizable monomer copolymerizable with said three monomers, with the monomer of formula (I) used in an amount of 1–90% by weight based on the total amount of all the monomers, (B) an aqueous polyurethane resin, and (C) a polyisocyanate compound having at least two isocyanate groups in the molecule, in which coating composition the ratio of the hydroxyl group of the acrylic copolymer and the isocyanate group of the polyisocyanate compound (C) is in the range of about 0.2:1 to about 3:1 in terms of NCO:OH equivalent ratio.

The aqueous coating composition of the present invention is hereinafter described in more detail.

Aqueous dispersion (A) of acrylic copolymer, or aqueous acrylic copolymer (A)

The alkoxysilane group-containing vinyl monomer represented by the above general formula (I), which is an essential constituent monomer of the acrylic copolymer, is a monomer component which imparts self-crosslinking property to the acrylic copolymer.

The "bivalent aliphatic saturated hydrocarbon group having 1–15 carbon atoms" represented by R₂ of general formula (I) includes straight chain or branched chain alkylene groups. Specific examples thereof are methylene, ethylene, propylene, 1,2-butylene, 1,3-butylene, tetramethylene, ethylethylene, pentamethylene, hexamethylene, heptamethylene, octamethylene and nonamethylene. Of these alkylene groups, those having 1–4 carbon atoms are preferred.

The "alkyl group having 1–6 carbon atoms" represented by R₃ and R₄ can be of straight chain or branched chain and includes, for example, methyl, ethyl, n-propyl, isopropyl, n-butyl, isobutyl, sec-butyl, tert-butyl, n-pentyl, isopentyl, neopentyl, n-hexyl and isohexyl. Of these alkyl groups, those having 1–4 carbon atoms are preferred. The "alkyl group having 1–10 carbon atoms" represented by R₅ can also be of straight chain or branched chain. Specific examples thereof include not only those groups mentioned as examples of the alkyl group having 1–6 carbon atoms, but also n-heptyl, 1-methylpentyl, 2-methylhexyl, n-octyl, n-nonyl and n-decyl. Of these alkyl groups, those having 1–6, particularly 1–4 carbon atoms are preferred.

The "alkoxy group having 1–10 carbon atoms" represented by R₃ and R₄ can be of straight chain or branched chain, and includes, for example, methoxy, ethoxy, n-propoxy, isopropoxy, n-butoxy, isobutoxy, sec-butoxy, tert-butoxy, n-pentoxy, isopentoxy, n-hexyloxy, isohexyloxy and n-octyloxy. Of these alkoxy groups, those having 1–6, particularly 1–4 carbon atoms are preferred.

In the general formula (I), n is an integer of 1–100, preferably 1–50, more preferably 1–10. When n is 2 or more, both R₃s and R₄s may be the same or different.

Specific examples of the compound of general formula (I) wherein A is

include the following: γ-(meth)acryloxyethyltrimethoxysilane, γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-(meth)acryloxypropyldimethylethoxysilane, γ-(meth)acryloxypropylphenylmethylmethoxysilane, γ-(meth)acryloxypropylphenylmethylethoxysilane,

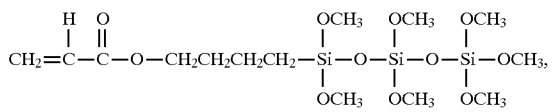

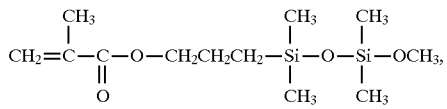

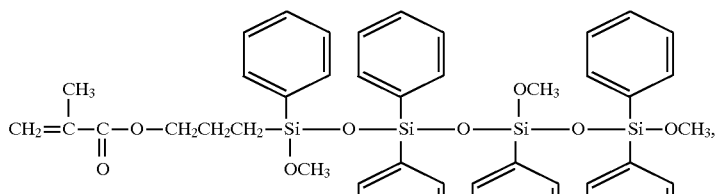

-continued

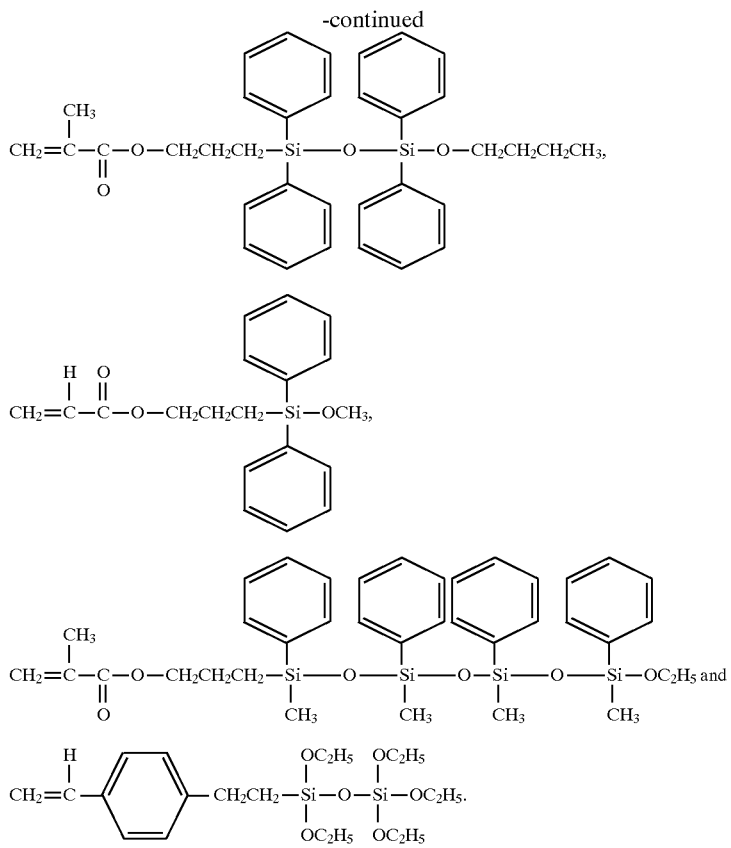

Specific examples of the compound of general formula (I) wherein A is

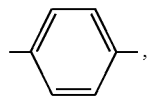, include the following:

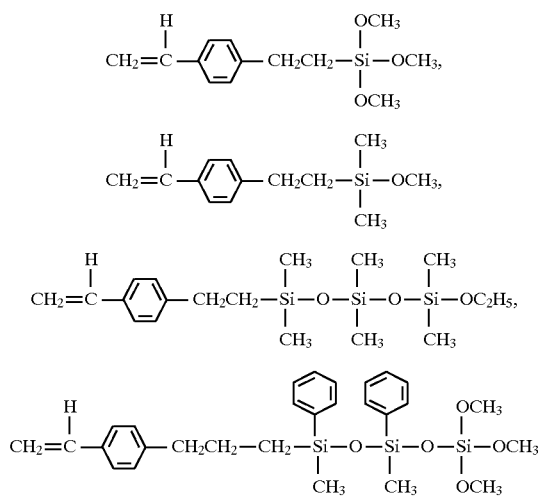

and

-continued

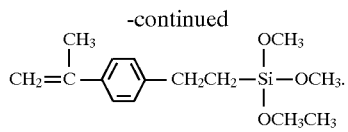

Of these compounds of general formula (I), particularly preferred are γ-acryloxypropyltrimethoxysilane, γ-methacryloxypropyltrimethoxysilane, γ-methacryloxypropyltriethoxysilane, γ-methacryloxypropyltri-n-butoxysilane, γ-acryloxypropylmethyldimethoxysilane, γ-methacryloxypropylmethyldimethoxysilane and γ-methacryloxypropylmethyldi-n-butoxysilane in view of the storage stability, etc. of the resulting aqueous coating composition.

The carboxyl group-containing unsaturated monomer used in the production of the acrylic copolymer is a compound of preferably up to 15 carbon atoms having, in the molecule, one or more, preferably one or two carboxyl groups [the carboxyl group(s) may take a form of acid anhydride] and one or more, preferably one polymerizable unsaturated bond. This monomer component imparts water-dispersibility to the copolymer and also acts as a crosslinking and curing catalyst for the coating film of the aqueous coating composition of the present invention.

As the carboxyl group-containing unsaturated monomer, there can be mentioned, for example, α,β-ethylenically unsaturated carboxylic acids such as (meth)acrylic acid, crotonic acid, maleic acid, maleic anhydride, itaconic acid, itaconic anhydride, fumaric acid, citraconic acid and the like. Of these, (meth)acrylic acid is particularly preferred.

The other monomer used as necessary in production of the acrylic copolymer includes hydroxyl group-containing unsaturated monomers and other radically polymerizable unsaturated monomers.

The hydroxyl group-containing unsaturated monomers include, for example, $C_{2-8}$ hydroxyalkyl esters of (meth) acrylic acid, such as 2-hydroxyethyl (meth)acrylate, 2-hydroxypropyl (meth)acrylate, 3-hydroxypropyl (meth) acrylate, hydroxybutyl (meth)acrylate and the like; monoethers between polyether polyol (e.g. polyethylene glycol, polypropylene glycol or polybutylene glycol) and hydroxyl group-containing unsaturated monomer [e.g. 2-hydroxyethyl (meth)acrylate]; adducts between 1 mole of a hydroxyl group-containing (meth)acrylic acid ester and 1–5 moles of a lactone [the commercial products of these adducts include, for example, Placcel FA-1 (an adduct between 1 mole of 2-hydroxyethyl acrylate and 1 mole of ε-caprolactone), Placcel FM-1, Placcel FM-3 and Placcel FM-5 (adducts between 1 mole of 2-hydroxyethyl methacrylate and 1 mole, 3 moles or 5 moles of ε-caprolactone) (Placcels are products of Daicel Chemical Industries, Ltd.) and TONE M-100 (an adduct between 1 mole of 2-hydroxyethyl acrylate and 2 moles of ε-caprolactone) (a product of Union Carbide Corp.)]; adducts between α,β-unsaturated carboxylic acid and monoepoxy compound [e.g. Cardura E10 (a product of Shell Japan Ltd.) or an α-olefin epoxide]; adducts between glycidyl (meth)acrylate and monobasic acid (e.g. acetic acid, propionic acid or a higher fatty acid); monoesters or diesters between acid anhydride group-containing unsaturated compound (e.g. maleic anhydride or itaconic anhydride) and glycol (e.g. ethylene glycol, 1,6-hexanediol or neopentyl glycol); hydroxyalkyl vinyl ethers such as hydroxyethyl vinyl ether and the like; chlorine-containing, hydroxyl group-containing monomers such as 3-chloro-2-hydroxypropyl (meth)acrylate and the like; and allyl alcohol. Of these, particularly preferred are 2-hydroxyethyl (meth)acrylate, 3-hydroxypropyl (meth) acrylate, hydroxybutyl (meth)acrylate and adducts between 1 mole of a hydroxyl group-containing (meth)acrylic acid ester and 1–5 moles of a lactone.

The other radically polymerizable unsaturated monomers include, for example, $C_{1-18}$ alkyl or cycloalkyl esters of (meth)acrylic acid, such as methyl (meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, 2-ethylhexyl (meth)acrylate, cyclohexyl (meth)acrylate, n-octyl (meth)acrylate, lauryl (meth)acrylate, tridecyl (meth)acrylate, stearyl (meth) acrylate and the like; $C_{2-18}$ alkoxyalkyl esters of (meth) acrylic acid, such as methoxybutyl (meth)acrylate, methoxyethyl (meth)acrylate, ethoxybutyl (meth)acrylate and the like; chain alkyl vinyl ethers such as ethyl vinyl ether, n-propyl vinyl ether, isopropyl vinyl ether, butyl vinyl ether, tert-butyl vinyl ether, pentyl vinyl ether, hexyl vinyl ether, octyl vinyl ether and the like; cycloalkyl vinyl ethers such as cyclopentyl vinyl ether, cyclohexyl vinyl ether and the like; aryl vinyl ethers such as phenyl vinyl ether, trivinyl phenyl ether and the like; aralkyl vinyl ethers such as benzylvinyl ether, phenethyl vinyl ether and the like; allyl ethers such as allyl glycidyl ether, allyl ethyl ether and the like; vinyl esters such as vinyl acetate, vinyl propionate, vinyl lactate, vinyl butyrate, vinyl isobutyrate, vinyl caproate, vinyl isocaproate, vinyl pivalate, vinyl caprate, Veova (a product of Shell Japan Ltd.) and the like; propenyl esters such as isopropenyl acetate, isopropenyl propionate and the like; olefin compounds such as ethylene, propylene, butylene, vinyl chloride and the like; diene compounds such as butadiene, isoprene, chloroprene and the like; vinyl aromatic compounds such as styrene, α-methylstyrene, vinyltoluene, α-chlorostyrene and the like; fluoroolefins such as tetrafluoroethylene, chlorotrifluoroethylene, hexafluoropropylene, vinyl fluoride, vinylidene fluoride and the like; and perfluoroalkyl group-containing (meth) acrylates such as perfluoromethyl (meth)acrylate, 2-perfluorooctylethyl (meth)acrylate and the like.

The acrylic copolymer used in the present invention can be obtained by copolymerizing at least one of alkoxysilane group-containing vinyl monomers represented by general formula (I), at least one of carboxyl group-containing unsaturated monomers (these two components are essential components), optionally a hydroxyl group-containing unsaturated monomer and, as necessary, other radically polymerizable monomer copolymerizable therewith, all mentioned above.

The proportions of these monomers used can be selected from a wide range depending upon, for example, the kinds of monomers and the application of finally obtained coating composition, but are generally as follows.

That is, the compound of general formula (I) can be used in an amount of 1–90% by weight, preferably 2–70% by weight, more preferably 3–50% by weight, particularly preferably 3–25% by weight based on the total amount of all the monomers used.

The carboxyl group-containing unsaturated monomer can be used in such an amount that the acid value of the acrylic copolymer based on the carboxyl group of the monomer is in the range of 20–150, preferably 30–135, more preferably 40–120.

When the hydroxyl group-containing unsaturated monomer is used as an essential component, it can be used in such an amount that the hydroxyl value of the acrylic copolymer based on the hydroxyl group of the monomer is in the range of 10–250, preferably 15–150, more preferably 30–140. The hydroxyl group-containing unsaturated monomer, however, may be used in a smaller amount or may not be used at all.

The other polymerizable monomer used as necessary can be appropriately selected in the range of 95–0% by weight, preferably 90–30% by weight, more preferably 88–50% by weight, particularly preferably 80–55% by weight, depending upon the properties required for the coating film formed.

The acrylic copolymer is preferably produced by combining the above-mentioned monomers appropriately and subjecting them ordinarily to solution polymerization in the presence of a radical polymerization initiator. The radical polymerization initiator usable in this solution polymerization includes, for example, peroxides such as benzoyl peroxide, di-t-butyl hydroperoxide, t-butyl hydroperoxide, cumyl peroxide, cumene hydroperoxide, di-isopropylbenzene hydroperoxide, t-butyl peroxybenzoate, lauryl peroxide, acetyl peroxide, t-butyl peroxy-2-ethylhexanoate and the like; and azo compounds such as α,α'-azobisisobutyronitrile, azobisdimethylvaleronitrile, azobiscyclohexanecarbonitrile and the like. These polymerization initiators can be used in the range of generally about 0.2–20 parts by weight, preferably 1.5–10 parts by weight per 100 parts by weight of all the monomers used in polymerization.

The polymerization can be conducted by a per se known process. The appropriate polymerization temperature is generally in the range of about 60°–160° C. The reaction can be completed generally in about 1–15 hours.

The acrylic copolymer used in the present invention appropriately has a number-average molecular weight in the range of generally about 1,000–60,000 (about 3,000–200,000 in terms of weight-average molecular weight), particularly about 1,000–30,000. When the number-average molecular weight is less than about 1,000, the coating film of the aqueous coating composition obtained tends to have low curability and durability. When the number-average molecular weight is more than about 60,000, the aqueous dispersion of the acrylic copolymer has a high viscosity, making difficult its handling.

The organic solvent used in the above solution polymerization is an organic solvent in which the acrylic copolymer, before converted to an aqueous dispersion, is soluble, and includes alcohol solvents such as ethanol, n-propanol, isopropanol, n-butanol, t-butyl alcohol, isobutyl alcohol, pentanol, 2-methyl-1-butanol, isopentyl alcohol, neopentyl alcohol, hexanol, heptanol, octanol, allyl alcohol, benzyl alcohol, cyclohexanol, 1,2-ethanediol, 1,2-propanediol, 1,2-butanediol, 1,5-pentanediol, glycerine and the like; and ether solvents such as dibutyl ether, ethyl vinyl ether, methoxytoluene, diphenyl ether, dioxane, propylene oxide, acetal, glycerine ether, tetrahydrofuran, 1,2-dimethoxyethane, cellosolve, methyl cellosolve, butyl cellosolve, methylcarbitol, 2-methoxyethanol, 2-ethoxyethanol, 2-butoxyethanol, diethylene glycol, diethylene glycol monoethyl ether, diethylene glycol monobutyl ether, triethylene glycol monomethyl ether, 1-methoxy-2-propanol, dipropylene glycol monomethyl ether and the like. These organic solvents can be used singly or in admixture of two or more.

The acrylic copolymer obtained can be made into an aqueous dispersion. It can be conducted by neutralizing the carboxyl group of the acrylic copolymer with a basic substance and then adding water to the neutralized copolymer or adding the neutralized copolymer to an aqueous medium, preferably water.

The former method of adding water to the neutralized copolymer is preferably conducted, for example, by adding a neutralizing agent to the copolymer obtained by solution polymerization, in a time as short as possible with stirring, to conduct neutralization and then conducting phase transition from organic solvent system to aqueous system in a short time, because this practice can prevent gelling. After the phase transition, the remainder of water is gradually added until a desired solid content is achieved, whereby an aqueous dispersion can be obtained.

In the above neutralization-aqueous system transition, there is a fear that at the time when a neutralizing agent is added to the copolymer, the hydrolysis of the alkoxysilane group of the copolymer and subsequent condensation proceed rapidly, inviting viscosity increase and gelling. In order to prevent it, the neutralization and water addition are conducted preferably in a short time. Specifically, the appropriate time for neutralization and water addition for phase transition is generally within 24 hours, preferably within 10 hours although the time differs depending upon the reactor, stirring conditions and atmospheric temperature.

The latter method of adding the neutralized copolymer to water can be conducted by adding a neutralizing agent to the copolymer in a short time with stirring, to obtain a neutralized copolymer and then adding the neutralized copolymer gradually to water with stirring, to obtain an aqueous dispersion. In this case, there is a fear that the neutralized copolymer causes viscosity increase and gelling before it is added to water. Therefore, it is preferable to obtain an aqueous dispersion in a time as short as possible. The appropriate time from neutralization to addition to water is generally within 24 hours, preferably within 10 hours.

Conversion of the acrylic copolymer to an aqueous dispersion without the occurrence of viscosity increase or gelling is achieved by adding water to the unneutralized copolymer to give rise to phase transition of copolymer from organic solvent system to aqueous system and then neutralizing the copolymer with a basic substance to obtain an aqueous dispersion. For example, water is added to the copolymer obtained by solution polymerization, with stirring, until phase transition to aqueous system takes place; then, a neutralizing agent is added to obtain an aqueous dispersion. In this method, since a basic substance (a neutralizing agent), which acts as a hydrolysis catalyst and further promotes crosslinking, is added after the phase transition to aqueous system, silanol group, etc. can be allowed to be present stably and the viscosity increase and gelling of copolymer can be prevented; therefore, this method is particularly advantageous for production of an aqueous dispersion of high concentration. Further, the aqueous dispersion obtained by this method has many silanol groups on the surface and has excellent crosslinkablity.

The appropriate temperature used in the above method for obtaining an aqueous dispersion is generally about 1°–90° C., preferably about 5°–50° C. When the temperature is lower than about 1° C., the system viscosity is high and the particles in dispersion tend to have large diameters. When the temperature is higher than about 90° C., the alkoxysilane group is hydrolyzed rapidly to form silanol group and a reaction between silanol groups takes place, which may cause viscosity increase and gelling.

The basic substance (neutralizing agent) used in obtaining an aqueous dispersion includes, for example, ammonia; primary monoamines such as ethylamine, propylamine, butylamine, benzylamine, monoethanolamine, neopentanolamine, 2-aminopropanol, 3-aminopropanol and the like; secondary monoamines such as diethylamine, diethanolamine, di-n- or di-isopropanolamine, N-methylethanolamine, N-ethylethanolamine and the like; and tertiary monoamines such as dimethylethanolamine, trimethylamine, triethylamine, triisopropylamine, methyldiethanolamine, dimethylaminoethanol and the like. Of these, ammonia and triethylamine are particularly preferred because they have low toxicity and, when the resulting aqueous dispersion is dried at ordinary temperature to form a coating film, hardly remain in the film and can provide a film of excellent properties.

The basic substance can be used in an amount of about 0.1–1.5 equivalents, preferably about 0.2–1 equivalent relative to the free carboxyl group present in the copolymer. When the amount of the basic substance used is less than about 0.1 equivalent, it is generally difficult to convert the copolymer to an aqueous dispersion and, even if it is possible, the resulting aqueous dispersion tends to have inferior storage stability. When the amount is more than about 1.5 equivalents, a large amount of the basic substance remains in the aqueous dispersion in a free form and the aqueous dispersion tends to have inferior storage stability.

The thus-obtained aqueous dispersion (A) of the acrylic copolymer is subjected as necessary to distillation at ordinary temperature or under reduced pressure to remove the organic solvent contained in the aqueous dispersion, and the content of the organic solvent can be reduced to about less than 10% by weight based on the amount of water present in the aqueous dispersion; thereby, the resulting aqueous dispersion is superior from the standpoints of storage stability, antipollution measure, etc.

Desirably, the aqueous dispersion (A) of the acrylic copolymer is controlled so as to have a resin solid content of generally about 1–70% by weight, preferably about 5–50% by weight. A solid content of less than about 1% by weight provides poor economy in forming a thick film. When the solid content is more than about 70% by weight, the copolymer particles cause agglomeration and precipitation and the aqueous dispersion may show viscosity increase and gelling. The average particle diameter of the copolymer in the aqueous dispersion is preferably in the range of about 0.01–1.0 μm.

Aqueous polyurethane resin (B)

The aqueous polyurethane resin used in the present invention is an aqueous dispersion, an aqueous emulsion or an aqueous solution of a polyurethane resin having urethane bond, obtained by, for example, reacting an isocyanate group-containing compound and a hydroxyl group-containing compound.

The isocyanate group-containing compound used in production of the polyurethane resin is an aliphatic, alicyclic or aromatic compound having, in the molecule, two or more, preferably two to four isocyanate groups. Examples thereof are aliphatic diisocyanates such as hexamethylene diisocyanate, trimethylhexamethylene diisocyanate and the like; ring-containing diisocyanates such as xylylene diisocyanate, isophorone diisocyanate and the like; terminal isocyanate-containing compounds obtained by reacting an excess of one of the above polyisocyanates with a low-molecular, active hydrogen-containing compound such as water, ethylene glycol, propylene glycol, trimethylolpropane, hexanetriol, castor oil or the like; and biuret type or isocyanurate type adducts of the above polyisocyanate compounds. These polyisocyanate compounds can be used singly or in admixture of two or more.

The hydroxyl group-containing compound to be reacted with the isocyanate group-containing compound is a compound having, in the molecule, two or more, preferably two to four hydroxyl groups. Examples thereof are glycols such as ethylene glycol, propylene glycol, diethylene glycol, 1,4-butanediol, 2,3-butanediol, 1,2-pentanediol, 3-methyl-4,3-pentanediol, 1,6-hexanediol, neopentyl glycol and the like; polylactone diols obtained by adding a lactone (e.g. ε-caprolactone) to one of the above glycols; polyester diols such as bis(hydroxyethyl) terephthalate and the like; polyether diols such as alkylene oxide adduct of bisphenol A, polyethylene glycol, polypropylene glycol and the like; dihydric alcohols of monoepoxy compound (e.g. α-olefin epoxide) or the like; trihydric or higher alcohols such as glycerine, trimethylolpropane, triglycerine, pentaerythritol and the like; polylactone polyols obtained by adding a lactone (e.g. ε-caprolactone) to one of the above trihydric or higher alcohols; alicyclic polyhydric alcohols such as 1,4-cyclohexanedimethanol, hydrogenated bisphenol and the like; and oxy acids such as p-oxy-benzoic acid, dimethylolpropionic acid and the like. These hydroxyl group-containing compounds can be used singly or in admixture of two or more.

The polyurethane resin used in the present invention is preferably a polyether type or polyester type polyurethane resin using, as the polyol component, a polyether polyol or a polyester polyol.

Production of the polyurethane resin from the above-mentioned isocyanate group-containing compound and the above-mentioned hydroxyl group-containing compound can be conducted in the same manner as in production of ordinary polyurethane resin. The produced polyurethane resin can be converted to an aqueous dispersion, an aqueous emulsion or an aqueous solution depending upon the properties of the polyurethane resin. For example, an aqueous dispersion or an aqueous emulsion can be obtained by mixing the polyurethane resin with water, and an aqueous solution can be obtained by neutralizing the carboxyl group possessed by the polyurethane resin and dissolving the neutralized polyurethane resin in water.

The solid content of the polyurethane resin in the aqueous dispersion, emulsion or solution can be generally about 10–50% by weight, preferably about 20–40% by weight.

The polyurethane resin preferably has a number-average molecular weight of generally about 1,000 or more, particularly about 10,000 or more. Desirably, substantially no free isocyanate group remains in the molecules of the polyurethane resin.

Polyisocyanate compound (C)

The polyisocyanate compound (C) used in the aqueous coating composition according to one particular aspect of the present invention is a compound having, in the molecule, two or more, preferably two or three isocyanate groups, and preferably is a polyisocyanate compound which is generally a liquid at ordinary temperature and which is non-yellowing from the weatherability standpoint.

Examples of the polyisocyanate compound (C) are aliphatic diisocyanates such as hexamethylene diisocyanate, trimethylhexamethylene diisocyanate and the like; ring-containing diisocyanates such as xylylene diisocyanate, isophorone diisocyanate and the like; terminal isocyanate-containing compounds obtained by reacting an excess of one of the above polyisocyanates with a low-molecular, active hydrogen-containing compound such as water, ethylene glycol, propylene glycol, trimethylolpropane, hexanetriol, castor oil or the like; and biuret type or isocyanurate type adducts of the above polyisocyanate compounds. These polyisocyanate compounds can be used singly or in admixture of two or more. Of these compounds, particularly preferred are aliphatic diisocyanates and biuret type or isocyanurate type adducts thereof.

In the present invention, the polyisocyanate compound (C) may be a polyisocyanate compound obtained by blocking the whole or part of the free isocyanate groups present in the above-mentioned polyisocyanate compound, with a blocking agent. When such a blocked polyisocyanate compound is used, the present coating composition can be used as a one-pack type coating composition. The blocking agent can be a per se known blocking agent, for example, a blocking agent of phenol type, alcohol type, lactam type, oxime type, cyane type or the like.

The polyisocyanate compound (C) may be mixed as necessary with an organic solvent to allow the compound (C) to have good miscibility with the components (A) and (B). The preferable organic solvent includes, for example, alcohol solvents such as n-propanol, isopropanol, n-butanol, t-butyl alcohol, isobutyl alcohol, pentanol, 2-methyl-1-butanol, isopentyl alcohol, neopentyl alcohol, hexanol, heptanol, octanol, allyl alcohol, benzyl alcohol, cyclohexanol, 1,2-ethanediol, 1,2-propanediol, 1,2-butanediol, 1,5-pentanediol, glycerine and the like; ether solvents such as dibutyl ether, ethyl vinyl ether, methoxytoluene, diphenyl ether, dioxane, proylene oxide, acetal, glycerine ether, tetrahydrofuran, 1,2-dimethoxyethane, cellosolve, methyl cellosolve, butyl cellosolve, methylcarbitol, 2-methoxyethanol, 2-ethoxyethanol, 2-butoxyethanol, diethylene glycol, diethylene glycol monoethyl ether, diethylene glycol monobutyl ether, triethylene glycol mono-methyl ether, 1-methoxy-2-propanol, dipropylene glycol monomethyl ether and the like; and ester solvents such as methyl acetate, ethyl acetate, propyl acetate, butyl acetate, isobutyl acetate, pentyl acetate, 3-methoxybutyl acetate, 2-ethylhexyl acetate, benzyl acetate, cyclohexyl acetate, methyl propionate, ethyl propionate, sebacic acid esters, phthalic acid esters, ethylene glycol monoacetate, propylene glycol monomethyl ether acetate, ethylene diacetate, cellosolve acetate, carbitol acetate, ethyl acetoacetate and the like. The amount of the organic solvent used can be generally about 0–40% by weight, preferably about 0–25% by weight, more preferably 0–15% by weight based on the weight of the polyisocyanate compound.

Aqueous coating composition

The aqueous coating composition of the present invention can be prepared, for example, by mixing the above-mentioned aqueous dispersion (A) of an acrylic copolymer and the above-mentioned aqueous polyurethane resin (B). The mixing proportions of the aqueous acrylic copolymer (A) and the aqueous polyurethane resin (B) have no particular restriction and can be varied over a wide range, depending upon the properties required for the final aqueous coating composition, the application thereof, etc. It is generally preferable that the proportions of the aqueous acrylic copolymer (A) and the aqueous polyurethane resin (B) are in the range of 10/90 to 80/20, particularly 20/80 to 70/30, more particularly 30/70 to 70/30 in terms of (A)/(B) solid content weight ratio.

When in the aqueous coating composition of the present invention, the acrylic copolymer has not only alkoxysilane group but also hydroxyl group and further the polyisocyanate compound (C) is used, the present aqueous coating composition can be a two-pack type aqueous coating composition consisting of a first liquid comprising the aqueous acrylic copolymer (A) and the aqueous polyurethane resin (B) and a second liquid comprising the polyisocyanate compound (C); and when the polyisocyanate compound (C) is a blocked polyisocyanate compound, the present aqueous coating composition can also be used as a one-pack type aqueous coating composition comprising the aqueous acrylic copolymer (A), the aqueous polyurethane resin (B) and the polyisocyanate compound (C).

In the above case, the mixing proportions of the aqueous acrylic copolymer (A) and the aqueous polyurethane resin (B) have no particular restriction and can be varied over a wide range, depending upon the properties required for the final aqueous coating composition, the application thereof, etc. It is generally preferable that the proportions of the aqueous acrylic copolymer (A) and the aqueous polyurethane resin (B) are in the range of 10/90 to 80/20, particularly 20/80 to 70/30, more particularly 30/70 to 70/30 in terms of (A)/(B) solid content weight ratio.

The polyisocyanate compound (C) can be used in such an amount that the ratio of the isocyanate group of the polyisocyanate compound (C) and the hydroxyl group of the acrylic copolymer is in the range of generally about 0.2:1 to about 3:1, preferably 0.5:1 to 2:1, more preferably 1:1 to 1.5:1 in terms of NCO:OH equivalent ratio.

The present aqueous coating composition can be suitably used in, for example, coatings, adhesives, inks and surface-treating agents.

The present aqueous coating composition can be used by itself but can contain, as necessary, additives such as extender pigment, coloring pigment, metallic pigment, dye, thickener, curing catalyst, ultraviolet absorber, antioxidant, antialgae agent, antimold agent, microbicide, defoaming agent and the like. These additives can be added, when the present aqueous coating composition is a two-pack type aqueous coating composition, to the first liquid or the second liquid or during their mixing and, when the present aqueous coating composition is a one pack-type aqueous coating composition, to a mixture of the components (A), (B) and (C).

The present aqueous coating composition, when used as a coating, can be applied onto various substrates by means of spray coating, roller coating, brush coating, dipping or the like. The amount applied is not particularly restricted but is generally in the range of about 1–1,000 μm in terms of film thickness as dried. Drying of coating film can be conducted at ordinary temperature but may be conducted by heating up to about 200° C. as necessary.

The present aqueous coating composition can form a coating film which is superior in water resistance and solvent resistance and good in adhesivity, film finish, etc.

The coating film formed with the present aqueous coating composition has a self-crosslinked siloxane bond which is chemically stable to water, basic substances, acidic substances, etc. Moreover, the present aqueous coating composition, since it contains a particular water-dispersible acrylic copolymer having silanol group and showing excellent crosslinkability, can form a coating film which, as compared with the coating film formed with a polyurethane resin alone, is superior in water resistance and solvent resistance and significantly improved in adhesivity and surface appearance of film.

The present aqueous coating composition containing the polyisocyanate compound (C), according to one particular aspect of the present invention can form a coating film which is superior in water resistance, solvent resistance, chemical resistance, drying property, etc. and which is significantly improved in film properties (a very high elongation is possible while an excellent tensile strength is maintained). Moreover, this aqueous coating composition, since it contains a particular water-dispersible acrylic copolymer having silanol group and hydroxyl group and showing excellent crosslinkability, can form a coating film which, as compared with the coating film having only urethane crosslink or formed with a polyurethane resin alone, is superior in drying property and tensile strength and which has a very high elongation imparted by combination use of polyurethane resin.

The present invention is hereinafter described more specifically by way of Examples and Comparative Examples. However, the present invention is not restricted to the following Examples. In the following, parts and % are basically by weight.

Production Example 1 for Acrylic Copolymer Aqueous Dispersion 100 parts of isopropanol was placed in a four-necked flask equipped with a thermometer, a stirrer, a condenser and a dropping funnel. Thereto were dropwise added, in 3 hours, the following monomers and polymerization initiator with refluxing. After the completion of the dropwise addition, aging was conducted for 2 hours.

| | |
|---|---|
| γ-Methacryloxypropyltrimethoxysilane | 13 parts |
| 2-Hydroxyethyl acrylate | 15 parts |
| Acrylic acid | 8 parts |
| n-Butyl methacrylate | 40 parts |
| Methyl methacrylate | 4 parts |
| Styrene | 20 parts |
| α,α'-Azobisisobutyronitrile | 4 parts |

The reaction mixture was transparent and had a nonvolatile content of 50% and a Gardner viscosity of J at 25° C. The formed polymer had an acid value of 58.4. The reaction mixture was cooled to 30° C. or below and 233 parts of water added thereto. Then, neutralization was conducted by 0.8 equivalent with triethylamine in 10 minutes, with stirring. Thereafter, isopropyl alcohol was removed under reduced pressure to obtain an aqueous dispersion containing no organic solvent. The aqueous dispersion had a nonvolatile content of 31% and a Gardner viscosity of B at 25° C.

Production Examples 2–6 for Acrylic Copolymer Aqueous Dispersions

Using the monomer compositions and polymerization initiators shown in Table 1, acrylic copolymer aqueous dispersions were produced in the same manner as in Production Example 1.

TABLE 1

|  | Production Examples of acrylic copolymer aqueous dispersions | | | | |
|---|---|---|---|---|---|
|  | 2 | 3 | 4 | 5 | 6 |
| Raw materials | | | | | |
| γ-Methacryloxypropyltrimethoxy-silane | 20.0 | 3.0 | 13.0 | — | — |
| γ-Methacryloxypropylmethyldimethoxysilane | — | — | — | 20.0 | — |
| 2-Hydroxyethyl acrylate | — | — | — | 13.0 | — |
| 2-Hydroxyethyl methacrylate | 10.0 | 20.0 | — | — | 15.0 |
| Acrylic acid | — | 10.0 | 10.0 | 8.0 | 10.0 |
| Methacrylic acid | 10.0 | — | — | — | — |
| n-Butyl acrylate | 25.0 | 35.0 | 27.0 | 14.0 | 35.0 |
| Methyl methacrylate | — | 12.0 | — | 25.0 | 20.0 |
| Ethyl methacrylate | 20.0 | — | 30.0 | — | — |
| Styrene | 15.0 | 20.0 | 20.0 | 20.0 | 20.0 |
| α,α'-Azobisisobutyronitrile | — | — | 2.5 | 5.0 | 4.0 |
| Azobisdimethylvaleronitrile | 3.0 | 5.0 | — | — | — |
| Acrylic copolymer | | | | | |
| Acid value | 65.2 | 77.9 | 77.9 | 62.3 | 77.9 |
| Viscosity | M | G | I | N | H |
| Acrylic copolymer aqueous dispersion | | | | | |
| Viscosity | C | A | B | C | A |

Production Example 7 for Acrylic Copolymer Aqueous Dispersion 100 parts of isopropanol was placed in a four-necked flask equipped with a thermometer, a stirrer, a condenser and a dropping funnel. Thereto were dropwise added, in 3 hours, the following monomers and polymerization initiator with refluxing. After the completion of the dropwise addition, aging was conducted for 2 hours.

| γ-Methacryloxypropyltrimethoxysilane | 13.0 parts |
|---|---|
| 2-Hydroxyethyl acrylate | 15.0 parts |
| Acrylic acid | 7.5 parts |
| n-Butyl acrylate | 7.5 parts |
| Methyl methacrylate | 34.5 parts |
| Styrene | 22.5 parts |
| α,α'-Azobisisobutyronitrile | 4 parts |

The reaction mixture was transparent and had a nonvolatile content of 50% and a Gardner viscosity of L at 25° C. The formed polymer had an acid value of 58.4 and a hydroxyl value of 72.5. The reaction mixture was cooled to 30° C. or below and 233 parts of water added thereto. Then, neutralization was conducted by 0.8 equivalent with triethylamine in 10 minutes, with stirring. Thereafter, isopropyl alcohol was removed under reduced pressure to obtain an aqueous dispersion containing no organic solvent. The aqueous dispersion had a nonvolatile content of 31% and a Gardner viscosity of A at 25° C.

Production Examples 8–12 for Acrylic Copolymer Aqueous Dispersions

Using the monomer compositions and polymerization initiators shown in Table 2, acrylic copolymer aqueous dispersions were produced in the same manner as in Production Example 7.

TABLE 2

|  | Production Examples of acrylic copolymer aqueous dispersions | | | | |
|---|---|---|---|---|---|
|  | 8 | 9 | 10 | 11 | 12 |
| Raw materials | | | | | |
| γ-Methacryloxypropyltrimethoxy-silane | 18.0 | 3.0 | 13.0 | — | — |
| γ-Methacryloxypropylmethyldimethoxysilane | — | — | — | 20.0 | — |
| 2-Hydroxyethyl acrylate | — | — | 10.0 | 13.0 | 15.0 |
| 2-Hydroxyethyl methacrylate | 15.0 | 20.0 | — | — | — |
| Acrylic acid | 10.0 | — | 15.0 | 8.0 | 8.0 |
| Methacrylic acid | — | 10.0 | — | — | — |
| n-Butyl acrylate | 12.5 | 27.0 | 10.0 | 7.0 | 15.0 |
| Methyl methacrylate | — | 25.0 | — | 32.0 | 42.0 |
| Ethyl methacrylate | 22.0 | — | 32.0 | — | — |
| Styrene | 22.5 | 15.0 | 20.0 | 20.0 | 20.0 |
| α,α'-Azobisisobutyronitrile | — | — | 2.5 | 5.0 | 4.0 |
| Azobisdimethylvaleronitrile | 2.5 | 4.5 | — | — | — |
| Acrylic copolymer | | | | | |
| Acid value | 77.9 | 65.2 | 48.4 | 62.3 | 60.5 |
| Hydroxyl value | 64.7 | 86.3 | 116.9 | 62.9 | 70.4 |
| Viscosity | M | J | K | L | K |
| Acrylic copolymer aqueous dispersion | | | | | |
| Viscosity | B | A1 | A | A | A1 |

EXAMPLE 1

The acrylic copolymer aqueous dispersion produced in Production Example 1 and Bayhydrol TPLS-2017 (a polyester-polyurethane resin dispersion, a product of Sumitomo Bayer Urethane Co., Ltd.) were mixed in a solid content ratio of 5/5 and stirred with a stirrer to produce an aqueous coating composition. The composition was tested for three items.

EXAMPLE 2

An aqueous coating composition was produced in the same manner as in Example 1 except that the aqueous dispersion was changed to one produced in Production Example 2. The composition was tested for three items.

EXAMPLE 3

The acrylic copolymer aqueous dispersion produced in Production Example 3 and SAMPRENE UX-8000 (a polyether-polyurethane resin dispersion, a product of Sanyo Chemical Industries, Ltd.) were mixed in a solid content ratio of 3/7 and stirred with a stirrer to produce an aqueous coating composition. The composition was tested for three items.

EXAMPLE 4

An aqueous coating composition was produced in the same manner as in Example 3 except that the aqueous dispersion was changed to one produced in Production Example 4. The composition was tested for three items.

EXAMPLE 5

The acrylic copolymer aqueous dispersion produced in Production Example 5 and SAMPRENE UX-8000 (a polyether-polyurethane resin dispersion, a product of Sanyo Chemical Industries, Ltd.) were mixed in a solid content ratio of 4/6 and stirred with a stirrer to produce an aqueous coating composition. The composition was tested for three items.

Comparative Example 1

The acrylic copolymer aqueous dispersion produced in Production Example 6 and SAMPRENE UX-8000 (a polyether-polyurethane resin dispersion, a product of Sanyo Chemical Industries, Ltd.) were mixed in a solid content ratio of 5/5 and stirred with a stirrer to produce an aqueous coating composition. The composition was tested for three items.

Comparative Example 2

The aqueous dispersion produced in Production Example 1 was tested for three items by itself.

The three items were tested as follows.
Gel fraction

A sample was coated on a glass plate and dried at 30° C. for 1 day or 7 days. The resulting coating film was examined as follows. That is, the film was removed from the glass plate and placed in acetone kept at its refluxing temperature; extraction was conducted for 5 hours; and the ratio (%) of remaining (undissolved) film was determined.
Water resistance A sample was coated on a tinplate sheet using a 200 μm applicator and dried at 30° C. for 7 days. The tinplate sheet having a film thereon was dipped in water of 30° C. for 2 days and then pulled out, and the condition of the film was examined.
Film surface condition The appearance, etc. of film surface was observed visually.

The test results are shown in Table 3.

EXAMPLE 7

A two-pack type aqueous coating composition was produced in the same manner as in Example 6 except that the aqueous dispersion was changed to one produced in Production Example 8. The composition was tested for three items.

EXAMPLE 8

The acrylic copolymer aqueous dispersion produced in Production Example 9 and SAMPRENE UX-8000 (a polyether-polyurethane resin dispersion, a product of Sanyo Chemical Industries, Ltd.) were mixed in a solid content ratio of 3/7 and stirred with a stirrer to obtain a mixture. Right before application, the mixture was mixed with DURANATE 24A-90CX (a biuret type of hexamethylene diisocyanate having a nonvolatile content of 90% and an NCO content of 21.2%, a product of Asahi Chemical Industry Co., Ltd.) diluted with propylene glycol monomethyl ether acetate to a nonvolatile content of 75%, in an NCO:OH equivalent ratio of 1:1. They were stirred with a stirrer to produce a two-pack type aqueous coating composition. The composition was tested for three items.

EXAMPLE 9

The acrylic copolymer aqueous dispersion produced in Production Example 10 and TAKELAC W-610 (an emulsion of non-yellowing self-emulsifiable anionic urethane, a product of Takeda Chemical Industries, Ltd.) were mixed in a solid content ratio of 4/6 and stirred with a stirrer to obtain a mixture. Right before application, the mixture was mixed with DURANATE 24A-90CX (a biuret type of hexamethylene diisocyanate having a nonvolatile content of 90% and an NCO content of 21.2%, a product of Asahi Chemical Industry Co., Ltd.) diluted with propylene glycol monomethyl ether acetate to a non-volatile content of 75%, in an NCO:OH equivalent ratio of 1:1. They were stirred with a

TABLE 3

|  | Examples | | | | | Comparative Examples | |
| --- | --- | --- | --- | --- | --- | --- | --- |
| Items | 1 | 2 | 3 | 4 | 5 | 1 | 2 |
| Film surface condition | Good | Good | Good | Good | Good | Good | Wrinkling surface |
| Gel fraction (%) | | | | | | | |
| After 1 day of drying | 84 | 86 | 80 | 83 | 85 | 0 | 66 |
| After 7 days of drying | 88 | 91 | 86 | 88 | 90 | 0 | 74 |
| Water resistance test | Good | Good | Good | Good | Good | Whitening | Good |

EXAMPLE 6

The acrylic copolymer aqueous dispersion produced in Production Example 7 and SAMPRENE UX-8000 (a polyether-polyurethane resin dispersion, a product of Sanyo Chemical Industries, Ltd.) were mixed in a solid content ratio of 5/5 and stirred with a stirrer to obtain a mixture. Right before application, the mixture was mixed with SUMIDUR N-3500 (an isocyanurate type of hexamethylene diisocyanate having a nonvolatile content of 100% and an NCO content of 21.6%, a product of Sumitomo Bayer Urethane Co., Ltd.) diluted with propylene glycol monomethyl ether acetate to a nonvolatile content of 75%, in an NCO:OH equivalent ratio of 1:1. They were stirred with a stirrer to produce a two-pack type aqueous coating composition. The composition was tested for three items.

stirrer to produce a two-pack type aqueous coating composition. The composition was tested for three items.

EXAMPLE 10

A two-pack type aqueous coating composition was produced in the same manner as in Example 9 except that the aqueous dispersion was changed to one produced in Production Example 11. The composition was tested for three items.

Comparative Example 3

A two-pack type aqueous coating composition was produced in the same manner as in Example 6 except that the aqueous dispersion was changed to one produced in Production Example 12. The composition was tested for three items.

Comparative Example 4

The acrylic polymer aqueous dispersion produced in Production Example 7 was tested for three items by itself.

The three items were tested as follows.

Gel fraction

A sample was coated on a glass plate and dried at 30° C. for 1 day or 7 days. The resulting coating film was examined as follows. That is, the film was removed from the glass plate and placed in acetone kept at its refluxing temperature; extraction was conducted for 5 hours; and the ratio (%) of remaining (undissolved) film was determined.

Tensile test

A sample was coated on a glass plate using a 200 μm applicator and dried at 30° C. for 30 days. Then, the resulting film was removed from the plate in a size of 20 mm×5 mm. The specimen was examined for tensile strength and elongation by pulling it using a tensile tester.

Film surface condition

The appearance, etc. of film surface was observed visually.

The test results are shown in Table 4.

TABLE 4

| Item | Examples | | | | | Comparative Examples | |
|---|---|---|---|---|---|---|---|
| | 6 | 7 | 8 | 9 | 10 | 3 | 4 |
| Film surface condition | Good | Good | Good | Good | Good | Good | Wrinkling surface |
| Gel fraction (%) | | | | | | | |
| After 1 day of drying | 89 | 90 | 86 | 88 | 91 | 78 | 65 |
| After 7 days of drying | 93 | 95 | 91 | 93 | 94 | 85 | 73 |
| Tensile test | | | | | | | |
| Tensile strength (kg/cm²) | 150 | 170 | 120 | 155 | 165 | 90 | 75 |
| Elongation (%) | 120 | 100 | 140 | 120 | 110 | 115 | 3 |

What is claimed is:

1. An aqueous coating composition comprising, as main components, (A) an aqueous dispersion of a water-dispersible acrylic copolymer having an acid value of 20–150 and a hydroxyl value of 10–250, which copolymer is obtained by subjecting to solution polymerization an alkoxysilane group-containing vinyl monomer represented by the following formula (I):

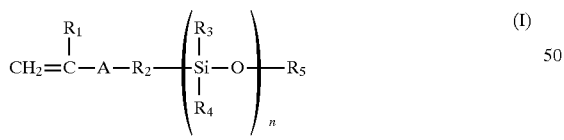

(wherein A is

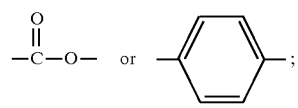

$R_1$ is a hydrogen atom or a methyl group; $R_2$ is a bivalent aliphatic saturated hydrocarbon group of 1–15 carbon atoms; $R_3$ and $R_4$ are each a phenyl group, an alkyl group of 1–6 carbon amounts or an alkoxy group of 1–10 carbon atoms; $R_5$ is an alkyl group of 1–10 carbon atoms; and n is an integer of 1–100)

with a carboxyl group-containing unsaturated monomer, a hydroxyl group-containing unsaturated monomer and, optionally, other polymerizable monomer copolymerizable with said three monomers, in an organic solvent, with the monomer of formula (I) used in an amount of 1–90% by weight based on the total amount of all the monomers, (B) an aqueous polyurethane resin, and (C) a polyisocyanate compound having at least two isocyanate groups in the molecule, in which coating composition the ratio of the hydroxyl group of the acrylic copolymer (A) and the isocyanate group of the polyisocyanate compound (C) is in the range of about 0.2:1 to about 3:1 in terms of NCO:OH equivalent ratio.

2. An aqueous coating composition comprising, as main components, (A) an aqueous dispersion of a water-dispersible acrylic copolymer having an acid value of 20–150, and a weight-average molecular weight of 3,000–200,000, which copolymer is obtained by subjecting to solution polymerization an alkoxysilane group-containing vinyl monomer represented by the following formula (I):

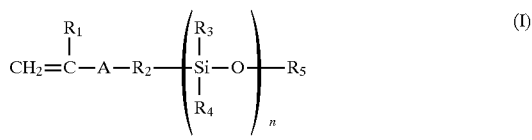

wherein A is

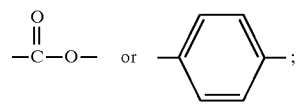

$R_1$ is a hydrogen atom or a methyl group; $R_2$ is a bivalent aliphatic saturated hydrocarbon group of 1–15 carbon atoms; $R_3$ and $R_4$ are each a phenyl group, an alkyl group of 1–6 carbon amounts or an alkoxy group of 1–10 carbon atoms; $R_5$ is an alkyl group of 1–10 carbon atoms; and n is an integer of 1–100, with a carboxyl group-containing unsaturated monomer and, optionally, other polymerizable monomer copolymerizable with said two monomers, in an organic solvent, with the monomer of formula (I) used in an amount of 1–90% by weight based on the total amount of all the monomers, and (B) an aqueous polyurethane resin.

3. A composition according to claim 2 or 1, wherein the alkoxysilane group-containing vinyl monomer is selected from the group consisting of γ-(meth)acryloxyethyltrimethoxysilane, γ-(meth)acryloxypropyltrimethoxysilane, γ-(meth)acryloxypropyltriethoxysilane, γ-(meth)acryloxypropyltripropoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxybutylphenyldimethoxysilane, γ-(meth)acryloxybutylphenyldiethoxysilane, γ-(meth)acryloxybutylphenyldipropoxysilane, γ-(meth)acryloxypropyldimethylmethoxysilane, γ-(meth)acryloxypropyldimethylethoxysilane, γ-(meth)acryloxypropylphenylmethylmethoxysilane, γ-(meth)acryloxypropylphenylmethylethoxysilane,

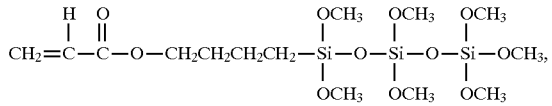

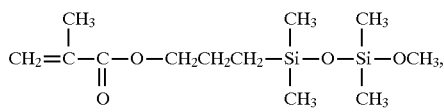

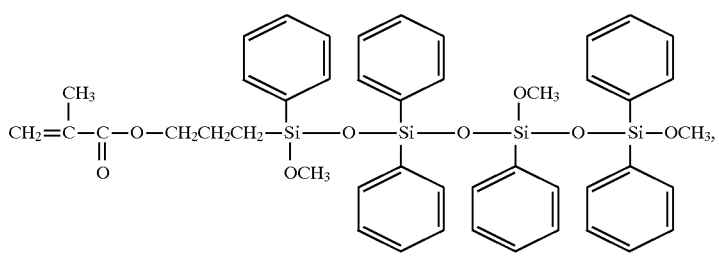

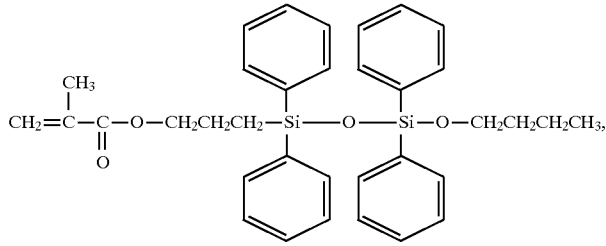

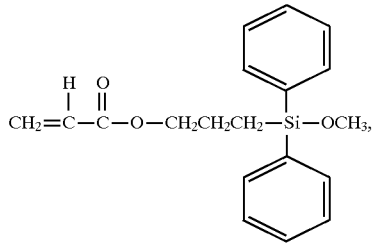

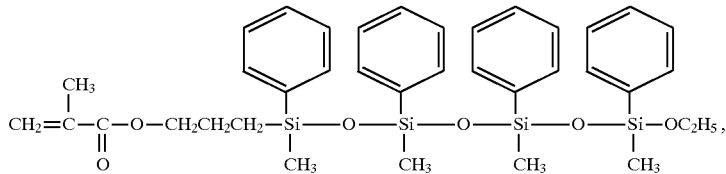

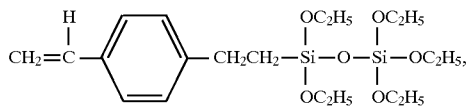

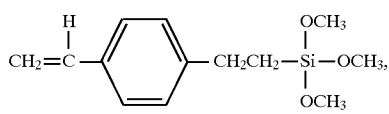

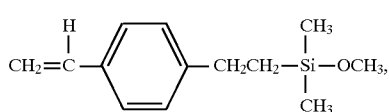

-continued

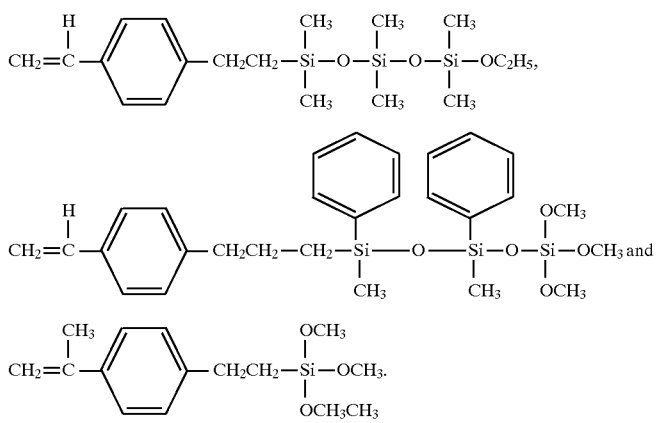

4. A composition according to claim 3, wherein the alkoxysilane group-containing vinyl monomer is selected from the group consisting of γ-acryloxypropyltrimethoxysilane, γ-methacryloxypropyltrimethoxysilane, γ-methacryloxypropyltriethoxysilane, γ-methacryloxypropyltri-n-butoxysilane, γ-acryloxypropylmehtyldimethoxysilane, γ-methacryloxypropylmethyldimethoxysilane and γ-methacryloxypropylmethyldinbutoxysilane.

5. A composition according to claim 2 or 1, wherein the carboxyl group-containing unsaturated monomer is selected from the group consisting of (meth)acrylic acid, crotonic acid, maleic acid, maleic anhydride, itaconic acid, itaconic anhydride, fumaric acid and citraconic acid.

6. A composition according to claim 5, wherein the carboxyl group-containing unsaturated monomer is (meth) acrylic acid.

7. A composition according to claim 2, wherein the other polymerizable monomer is selected from the group consisting of hydroxyl group-containing unsaturated monomers and other radically polymerizable unsaturated monomers.

8. A composition according to claim 1, wherein the hydroxyl group-containing unsaturated monomer is selected from the group consisting of $C_{2-8}$ hydroxyalkyl esters of (meth)acrylic acid, monoethers of polyether polyol and hydroxyl group-containing unsaturated monomer, adducts of 1 mole of a hydroxyl group-containing (meth)acrylic acid ester and 1–5 moles of a lactone, adducts of α,β-unsaturated carboxylic acid and monoepoxy compound, adducts between glycidyl (meth)acrylate and monobasic acid, monoesters or diesters of acid anhydride group-containing unsaturated compound and glycol, dihydroxyalkyl vinyl ethers, 3-chloro-2-hydroxypropyl (meth)acrylate and allyl alcohol.

9. A composition according to claim 8, wherein the hydroxyl group-containing unsaturated monomer is selected from the group consisting of 2-hydroxyethyl (meth)acrylate, 3-hydroxypropyl (meth)acrylate, hyroxybutyl (meth) acrylate and adducts of 1 mole of a hydroxyl group-containing (meth)acrylic acid ester and 1–5 moles of a lactone.

10. A composition according to claim 2 or 1, wherein the amount of the alkoxysilane group-containing vinyl monomer used is 2–70% by weight, based on the total amount of all the monomers.

11. A composition according to claim 2 or 1, wherein the acrylic copolymer has an acid value of 30–135.

12. A composition according to claim 1, wherein the acrylic copolymer has a hydroxyl value of 15–150.

13. A composition according to claim 2 or 1, wherein the polyurethane resin is a polyether or polyester polyurethane resin.

14. A composition according to claim 2 or 1, wherein the polyurethane resin has a number-average molecular weight of 1,000 or more.

15. A composition according to claim 1, wherein the polyisocyanate compound (C) is a non-yellowing polyisocyanate compound which is a liquid at room temperature.

16. A composition according to claim 15, wherein the polyisocyanate compound (C) is an aliphatic diisocyanate compound or a biuret or isocyanurate adduct thereof.

17. A composition according to claim 2 or 1, comprising the aqueous acrylic copolymer (A) and the aqueous polyurethane resin (B) in the range of 10/90 to 80/20 in terms of (A)/(B) solid content weight ratio.

18. A composition according to claim 17, comprising the aqueous copolymer (A) and the aqueous polyurethane resin (B) in the range of 20/80 to 70/30 in terms of (A)/(B) solid content weight ratio.

19. A composition according to claim 1, which is a two-pack type aqueous coating composition consisting of a first liquid comprising the aqueous acrylic copolymer (A) and the aqueous polyurethane resin (B) and a second liquid comprising the polyisocyanate compound (C).

20. A composition according to claim 1, which is a one-pack type aqueous coating composition comprising the aqueous acrylic copolymer (A), the aqueous polyurethane resin (B) and the polyisocyanate compound (C), wherein the polyisocyanate compound (C) is a blocked polyisocyanate compound.

21. A composition according to claim 1, which comprises the polyisocyanate compound (C) in such an amount that the ratio of the hydroxyl group of the acrylic copolymer and the isocyanate group of the polyisocyanate compound (C) is in the range of 0.2:1 to 3:1 in terms of NCO:OH equivalent ratio.

22. A composition according to claim 21, wherein the NCO:OH equivalent ratio is in the range of 0.5:1 to 2:1.

23. Coated articles obtained by using the aqueous coating composition of claim 2 or 1.

24. A composition according to claim 10, wherein the amount of the alkoxysilane group-containing vinyl monomer used is 3–50% by weight, based on the total amount of all the monomers.

25. A composition according to claim 11, wherein the acrylic copolymer has an acid value of 40–120.

26. A composition according to claim 12, wherein the acrylic copolymer has a hydroxyl value of 30–140.

27. A composition according to claim 2, wherein the aqueous dispersion (A) is obtained by subjecting the acrylic copolymer, which has been formed by solution polymerization, to neutralization with a basic substance, and then to dispersion in water.

28. A composition according to claim 2, wherein the aqueous dispersion (A) is obtained by subjecting the acrylic copolymer, which has been formed by solution polymerization, to dispersion in water, and then to neutralization with a basic substance.

* * * * *